March 10, 1931.  K. FREY  1,795,944
STEAM TURBINE GOVERNING APPARATUS
Filed Oct. 28, 1927
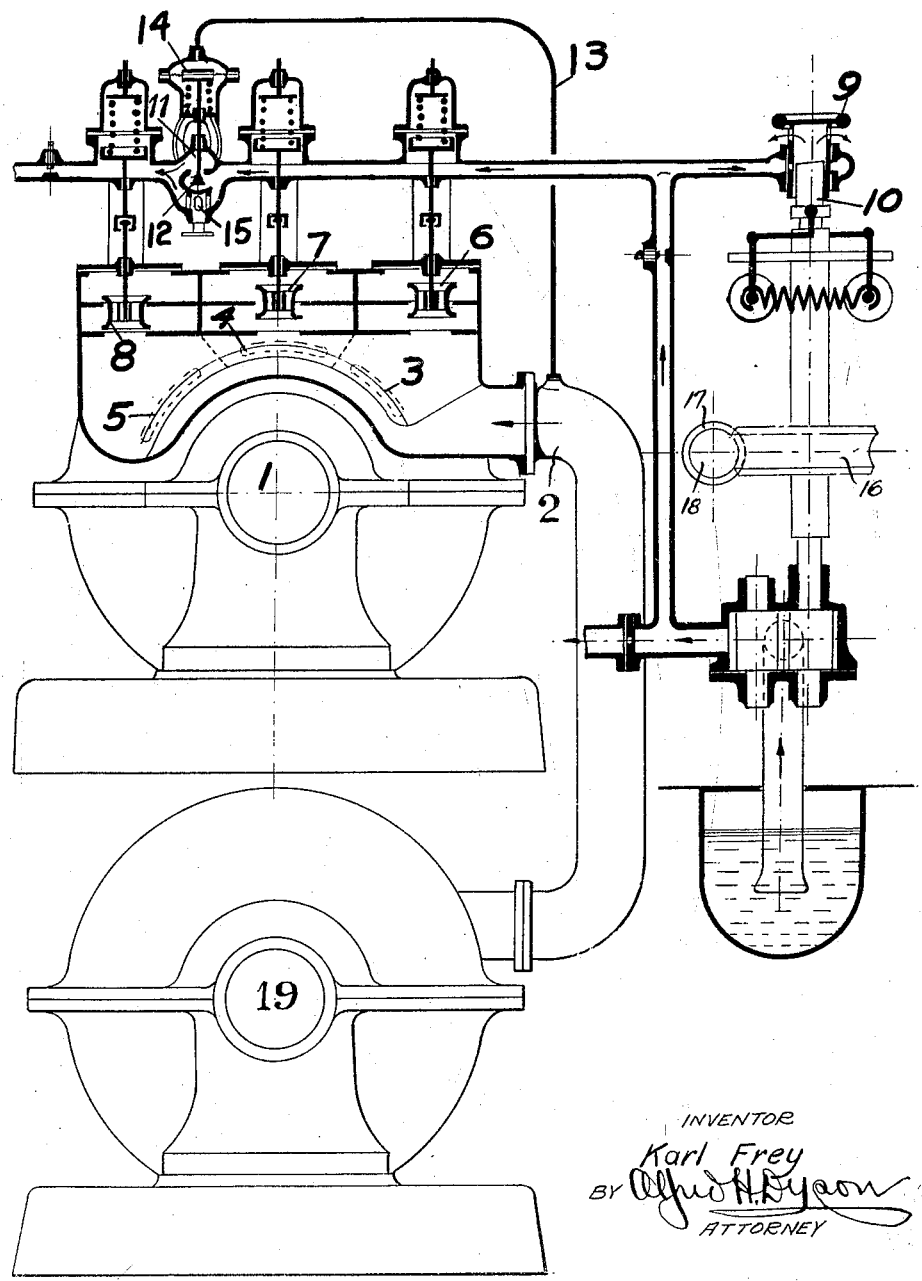
INVENTOR
Karl Frey
BY Alfred H. Dyson
ATTORNEY Patented Mar. 10, 1931

1,795,944

UNITED STATES PATENT OFFICE

KARL FREY, OF ENNETBADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

STEAM-TURBINE GOVERNING APPARATUS

Application filed October 28, 1927, Serial No. 229,295, and in Germany November 10, 1926.

This invention relates to improvements in steam turbine governing apparatus.

Steam turbines operating in series, the first being a high-pressure turbine exhausting into a second at a pressure corresponding to the normal supply pressures hitherto employed are familiar in the art and are exemplified by the installations resulting from the addition of a high-pressure primary turbine to an existing normal-pressure plant. Two methods of governing such installations are known, one being to govern the high-pressure turbine alone, and the other to govern both the high-pressure and the normal or low-pressure turbines together.

The present invention concerns an economical and reliable method of governing according to the second of the two methods referred to above, and one which may be embodied in a simple constructional form. According to this method the governor control is confined to the high-pressure turbine for all loads on the normal-pressure turbine up to that which gives the highest efficiency, and for loads exceeding this, means are employed to maintain the inlet pressure on the normal-pressure turbine corresponding to this economical load at an approximately constant value. With impulse turbines this result may be obtained by opening additional nozzles or nozzle groups as the load exceeds the aforesaid critical value. With reaction turbines the admission pressure may be kept constant by by-passing a section of the blading in a manner familiar in the art.

Unless some such method of governing is employed, an overload on the set will result in such an increase in the back-pressure on the high-pressure turbine that its efficiency will be substantially lowered owing to the reduced heat drop, while at the same time it will take a smaller proportion of the total load on the set comprising both turbines. Consequently, the normal-pressure turbine will be heavily overloaded as a result of the enlarged heat drop and the increased quantity of steam. This inequitable distribution of the load becomes a very great disadvantage when the high-pressure and low-pressure turbines each drive a separate machine such as an electric generator, for example. When designing a complete new installation, the generator for the low-pressure turbine must be made disproportionately large. As mentioned above, however, the primary high-pressure set is frequently added to an existing normal-pressure installation, and the generator of the normal-pressure part is then unable to take the extra load. Furthermore, it frequently happens that the existing normal-pressure turbine is unable to withstand the increased admission pressure of the steam which results as explained above. One of the objects of the present invention, therefore, is to provide improved steam turbine governing apparatus which avoids the above drawbacks or disadvantages, and wherein the glands need only be designed to withstand the boundary pressure at normal load, that is, the normal pressure of the low-pressure supply. By boundary pressure is meant the pressure of the steam between the two turbines, the high-pressure and the low-pressure.

This limitation of the boundary pressure may be effected very simply, for example, by making the overload valve or valves of the normal-pressure turbine responsive to the governor controlling the admission of high-pressure steam for all loads in excess of the most economical load for the turbine. It is convenient to make use of the boundary pressure for this purpose.

For the purpose of illustrating the invention, one embodiment thereof is shown in the drawing which is a schematic illustration of governing apparatus embodying the present improvements.

The normal-pressure turbine 1 receives the exhaust steam of the primary turbine 19 from the pipe 2. The nozzle groups 3 and 4 are designed to supply the economical load, the nozzle group 5 being for overloads. Up to the economical load the nozzle valves 6 and 7 controlling the nozzle groups 3 and 4 will be open. The overload valve 8 remains closed until the economical load has been reached, and will only open when the boundary pressure of the combined set is about equal to the normal pressure of the low-pressure turbine. The operation of the valve 8 may be effected, as shown in the drawing, by well-known actuating means comprising a pressure device 11 which admits pressure oil to the operating piston of the valve through the medium of a small valve 12. This small valve is actuated by a diaphragm 14 which is subjected to the boundary pressure of the steam by means of the pipe 13. When this boundary pressure rises the diaphragm is depressed and valve 12 opened. Steam will therefore be admitted to the nozzle group 5 as long as the boundary pressure exceeds the normal pressure, that is to say, until the load on the normal-pressure turbine again becomes less than the economical load.

The arrangement described possesses a further advantage, namely, that the turbine 1 can be operated at any time as a normal-pressure turbine with normal-pressure steam which may be supplied through the pipe 2. Such normal-pressure steam may even be used in conjunction with the exhaust from the primary turbine. This is made possible by the fact that the boundary pressure never exceeds the normal pressure, that is, that of the low-pressure steam range.

If the normal-pressure turbine is to be operated alone, the usual type of governor gear, shown in the drawing, must be provided. This may, however, be readily adapted to the method of governing according to the present invention. In the drawing, the governor has been displaced to the right with respect to turbine 1 for convenience of illustration, but it will be understood that the governor is actually disposed at one end of the turbine and is operatively connected thereto in the usual manner through the worm gear 16 and the worm 17 fixed on shaft 18 of turbine 1. As shown in the drawing, the governor 10 is connected in the usual way, via the sleeve 9, to the oil pressure system which operates the overload valve 8. If the low-pressure turbine is operated with low-pressure steam alone, the governor will function in the ordinary way, varying the oil pressure according to the load and successively operating the valves 6, 7 and 8 in a manner familiar in the art. The overload valve 8, in such case, is placed in direct connection with the pressure oil system by means of the valve 15 which by-passes the pressure device 11 and thus renders it inoperative, that is, the pressure oil is allowed free access to the operating piston of valve 8 even if the pressure in pipe 2 falls below the prescribed boundary pressure.

If it is desired, however, to operate this turbine with exhaust from the high-pressure turbine alone, the governor sleeve 9 must be screwed down until no oil is permitted to escape under normal conditions of speed or frequency fluctuations, that is, the pressure in the oil system is maintained at such a value that the nozzle valves are kept open. To prevent the overload valve from opening until the economical load is exceeded, that is, to make the overload valve responsive to the boundary pressure in the pipe 2, the valve 15 is closed, the valve 8 being then controlled by the pressure device 11.

While but one embodiment of the invention has been shown and described, it will be understood that various modifications might be adopted without departing from the spirit of the invention or the scope of the claims.

The invention claimed is:

1. In steam turbine apparatus, a steam turbine, a steam-supply connection for said turbine, valve means operable to control the supply of operating steam to said turbine, actuating means for said valve means, governing means for said turbine including a fluid-pressure line, valve means operable to provide for communication between said actuating means and said line, and means responsive to a predetermined pressure condition in said connection and being operable upon occurrence of such condition to effect opening action of said second-named valve means.

2. In steam turbine apparatus, a steam turbine, a steam-supply connection for said turbine, valve means operable to control the supply of operating steam to said turbine, actuating means for said valve means, governing means for said turbine including a fluid-pressure line, valve means operable to provide for communication between said actuating means and said line, means responsive to a predetermined pressure condition in said connection and being operable upon occurrence of such condition to effect opening action of said second-named valve means, and means operable to provide for communication between said actuating means and said line independently of operating action of said second-named valve means.

3. In steam turbine apparatus, a steam turbine, a steam-supply connection for said turbine, valves operable to control the supply of operating steam to said turbine, fluid-pressure motors associated respectively with said valves for actuating the same, governing means for said turbine including a fluid-pressure line, said motors being in direct communication with said line, valve means disposed in said line at a point intermediate said motors and being operable to open and close said line at said point, and means responsive to a predetermined pressure condition in said connection and being operable upon occurrence of such condition to effect opening action of said valve means.

4. In steam turbine apparatus, a steam turbine, a steam-supply connection for said turbine, valves operable to control the supply of operating steam to said turbine, fluid-pressure motors associated respectively with said valves for actuating the same, governing means for said turbine including a fluid-pressure line, said motors being in direct communication with said line, valve means disposed in said line at a point intermediate said motors and being operable to open and close said line at said point, a fluid-pressure device responsive to a predetermined pressure condition and being operable upon occurrence of such condition to effect opening action of said valve means, and means providing communication between said device and said connection.

5. In steam turbine apparatus, a steam turbine, a steam-supply connection for said turbine, valves operable to control the supply of operating steam to said turbine, fluid-pressure motors associated respectively with said valves for actuating the same, governing means for said turbine including a fluid-pressure line, said motors being in direct communication with said line, valve means disposed in said line at a point intermediate said motors and being operable to open and close said line at said point, means responsive to a predetermined pressure condition in said connection and being operable upon occurrence of such condition to effect opening action of said valve means, and second valve means operable to provide communication between points in said line on opposite sides of said first-named valve means and independently of the latter.

6. In steam turbine apparatus, a high-pressure turbine, a low-pressure turbine, means for supplying said low-pressure turbine with exhaust steam from said high-pressure turbine, the pressure of said exhaust steam varying with the load condition of said turbines up to substantially the pressure corresponding to the economical load thereon, and means responsive to overload conditions in said turbines for maintaining said exhaust steam pressure substantially constant during said overload condition.

7. In steam turbine apparatus, a high-pressure turbine, a low-pressure turbine, means for supplying said low-pressure turbine with exhaust steam from said high-pressure turbine, the pressure of said exhaust steam varying with the load condition of said turbines up to substantially the pressure corresponding to the economical load thereon, and means responsive to overload conditions in said turbines for maintaining said exhaust steam pressure, during said overload condition, substantially constant and at a value substantially equal to that of said exhaust steam during economical load conditions in said turbines.

8. In steam turbine apparatus, a high-pressure turbine, a low-pressure turbine, means for supplying said low-pressure turbine with exhaust steam from said high-pressure turbine, the pressure of said exhaust steam varying with the load condition of said turbines up to substantially the pressure corresponding to the economical load thereon, and means responsive to overload conditions in said turbines for maintaining said exhaust steam pressure substantially constant during said overload condition, said last-named means comprising governor-controlled overload valve means associated with said low-pressure turbine.

9. In steam turbine apparatus, a high-pressure turbine, a low-pressure turbine, means for supplying said low-pressure turbine with exhaust steam from said high-pressure turbine, the pressure of said exhaust steam varying with the load condition of said turbines up to substantially the pressure corresponding to the economical load thereon, and means responsive to overload conditions in said turbines for maintaining said exhaust steam pressure, during said overload condition, substantially constant and at a valve substantially equal to that of said exhaust steam during economical load conditions in said turbines, said last-named means comprising governor-controlled overload valve means associated with said low-pressure turbine.

In testimony whereof I have hereunto subscribed my name this 14 day of October A. D. 1927.

KARL FREY.